July 2, 1940.  W. C. PEYTON  2,206,751

DEMAND METER HAVING LIGHT SENSITIVE CONTROL MEANS

Filed Feb. 27, 1933  2 Sheets-Sheet 1

INVENTOR.
William C. Peyton
BY
E. Archer Turner
ATTORNEY.

July 2, 1940.  W. C. PEYTON  2,206,751
DEMAND METER HAVING LIGHT SENSITIVE CONTROL MEANS
Filed Feb. 27, 1933   2 Sheets-Sheet 2

INVENTOR.
William C. Peyton
BY
ATTORNEY.

Patented July 2, 1940

2,206,751

UNITED STATES PATENT OFFICE 2,206,751

DEMAND METER HAVING LIGHT SENSITIVE CONTROL MEANS

William C. Peyton, New York, N. Y., assignor to The Standard Stoker Company, Inc., a corporation of Delaware Application February 27, 1933, Serial No. 658,772

5 Claims. (Cl. 171—34)

This invention relates generally to light sensitive control devices and has for one of its objects the provision and arrangement of such a device in an electric power system for automatically limiting the current or power demand to a predetermined maximum.

Another object of the invention resides in the provision of an improved light sensitive control device comprising a light source, a phototube, an amplifying system and a relaying device, the improvements residing in the arrangement and relation of the parts of the device.

More specifically, the invention contemplates the provision in a power system having a power line and one or more feed lines and a demand meter interposed therebetween, of a light sensitive control device, of the type described, responsive to the demand meter when it registers a predetermined maximum, arranged to interrupt the flow of current through one or more of said feed lines.

Still another object of the invention resides in the provision with a demand meter and a light sensitive control device of readily and conveniently adjustable means whereby the light sensitive control device will become responsive to the demand meter at a predetermined demand.

Many specific objects and advantages of the invention will be apparent from the following description when read with the accompanying drawings, in which—

Figure 1:
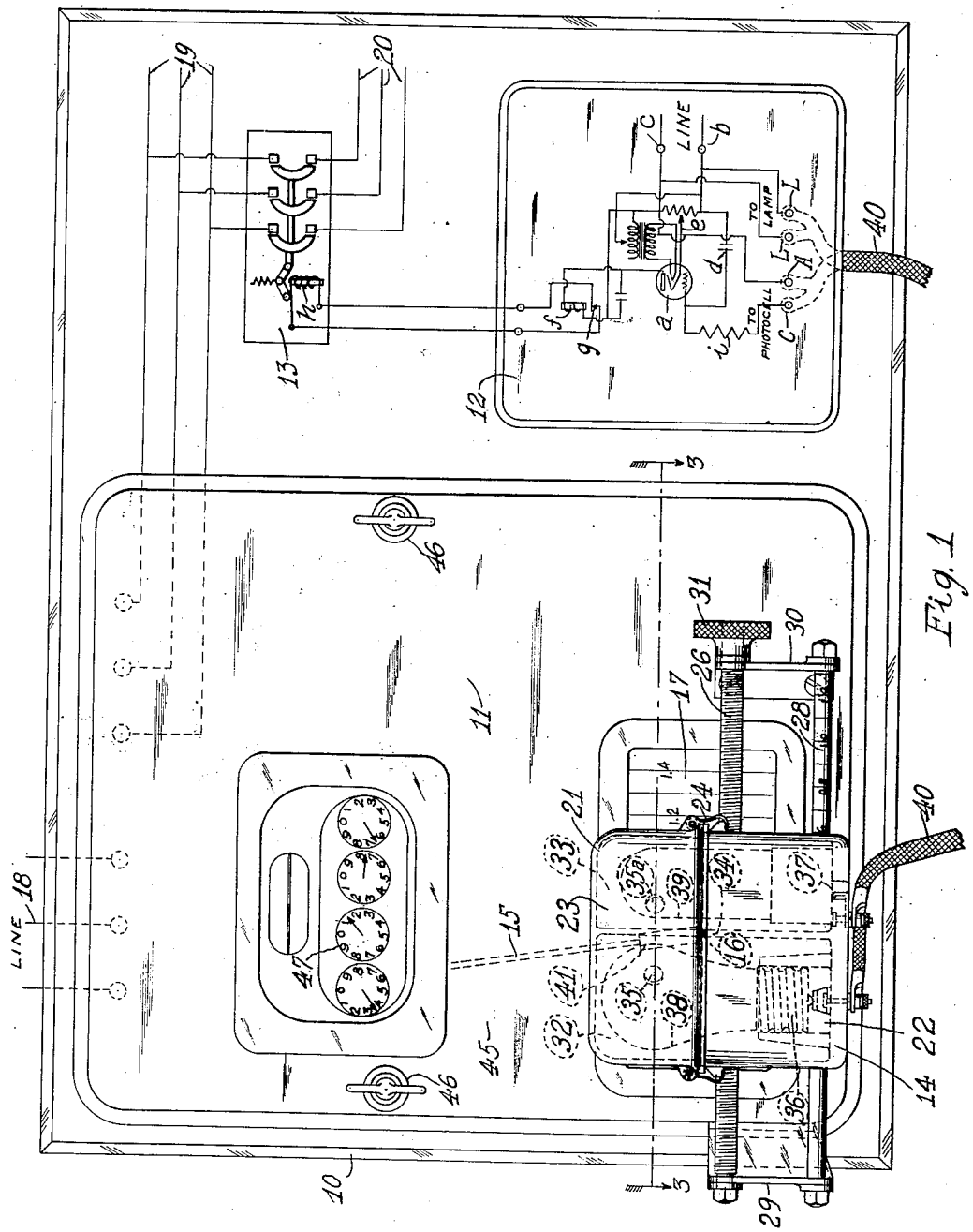
Figure 1 is a view, in elevation, of a demand meter mounted on a switchboard and being equipped with this control unit.
Figure 2:
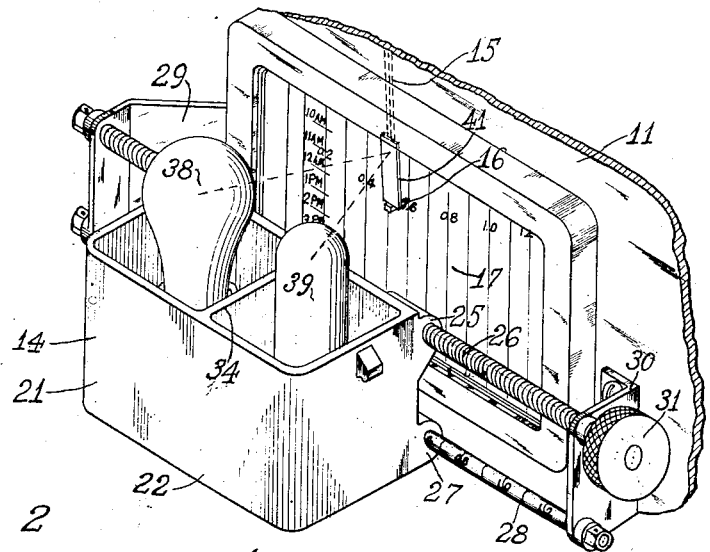
Figure 2 is an isometric view of the control unit with the cover removed exposing the beam lamp and the photocell.
Figure 3:
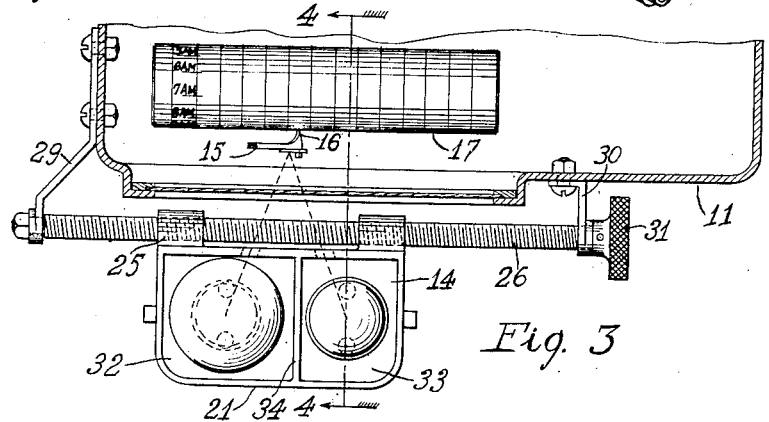
Figure 3 is a horizontal sectional view taken on the broken line of 3—3 in Figure 1.
Figure 4:
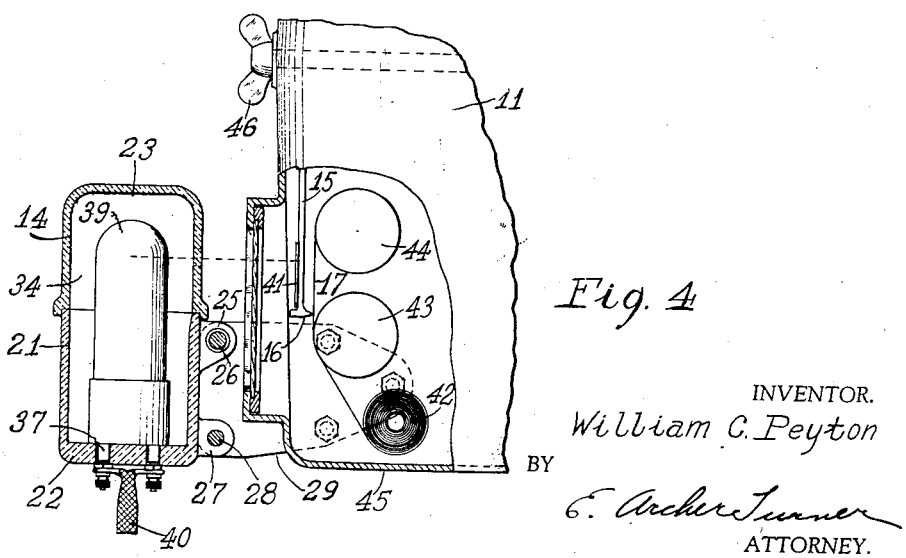
Figure 4 is a vertical sectional view of the control unit taken on the broken line 4—4 in Figure 3 and with some parts of the demand meter removed.

Referring to the drawings, the illustrated embodiment there shown comprises a switchboard 10, having mounted thereon a demand meter 11, a relay or relay unit 12, a contactor or power switch 13 and a light sensitive control unit 14.

The demand meter 11 comprises a rotatable pointer 15 provided at one end with a pen 16 arranged to trace a line on a tape 17 as it travels thereacross. The tape 17 is scaled horizontally in any arbitrary units which in the present instance have been adopted as 0.2 to 1.4 and scaled vertically into units of time, as shown, into hourly units.

The pen 16 is arranged to travel horizontally from the low end of the scale towards the high end thereof as the electric current demand increases. The means for moving the pointer and pen is not shown or described, since it is in itself not novel and any means well known to those familiar with the art may be provided. Thus the extremity of the line at the high end of the scale will denote the maximum demand.

It is usual to base a charge for electric power on the maximum demand over a particular interval of time. For example, the maximum demand over a fifteen minute period at any tiime during the month may form the basis of a charge for current consumed during that month. In order to register on the tape 17 the maximum demand during each fifteen minute period, clock operated mechanism is employed to raise the tape 17 a quarter of the distance between two of the successive hourly markings and simultaneously move the pen back to the extreme low end of the horizontal scale. This mechanism is conventional in the art and is therefore not illustrated or described. In this manner the maximum demand during each and every fifteen minute period is recorded on the tape 17 and the highest maximum demand for a fifteen minute period during the month forms the basis of the charge even though that peak demand may have been reached for only a few minutes during the entire month.

The present invention provides means for establishing a more uniform current demand, eliminating the high peaks on the recording tape by automatically interrupting the flow of current through one or more of the feed lines that supply power to machines or other devices whose operation need not be continuous, when a predetermined maximum demand has been reached. This predetermined maximum demand point at which current to one or more of the feed lines is interrupted may be adjusted and regulated as desired. In this manner a great saving in power charges is effected and since my device is automatic in operation the only expense involved is the initial installation and the slight maintenance cost.

Referring again to the drawings, a power line leading to the demand meter 11 is shown at 18, and a plurality of primary feed lines 19 and a plurality of secondary feed lines 20 are shown leading from the demand meter 11. The secondary feed lines 20 supply current to such machines as are operated only occasionally or whose operation may be interrupted without inconvenience at any time. The present invention is arranged to automatically interrupt the flow of current through the secondary feed lines 20 when the current demand on the primary feed lines 19 is heavy, and when the demand on the primary lines 19 is light, current again passes through the secondary lines 20. Thus a more uniform demand is maintained and an excessively high demand is at all times avoided.

The control means for cutting in and cutting out the secondary feed lines 20 will now be described in detail. The light sensitive control unit 14 comprises a box or container 21 having a base 22 and a cover 23, the latter being secured to the base 22 by the spring clips 24. The base 22 is provided with lugs 25 through which is threaded a threaded rod 26, and lugs 27 through which a rod 28 passes freely. The rods 26 and 28 are in horizontal alignment with each other and are received at their respective opposite ends in the brackets 29 and 30 which extend outwardly from the meter at opposite lower sides of the exposed portion of the tape 17. The threaded rod 26 is provided at one end with a knob 31 by which the rod 26 may be rotated causing the control unit 14 to move horizontally along the threaded rod 26 and parallel to the plane of tape 17, thereby permitting convenient adjustment of the control unit with respect to the scaled tape 17. Rod 28 may be correspondingly scaled for convenience in setting unit 14 in a desired position.

The box or container 21 is divided into the two compartments 32 and 33 by a partition 34, and these compartments are sealed against light except for the apertures 35 and 35a which communicate with the compartments 32 and 33, respectively. The compartments 32 and 33 are provided with the sockets 36 and 37, respectively, in which sockets are secured respectively, the lamp 38 and the photoelectric cell 39 spaced a fixed distance apart. Electric current is supplied to the lamp 38 and the photoelectric cell 39 through the cable 40.

A reflecting surface or mirror 41 is provided on the pen 16 so that, when the pen has moved to a predetermined position on the tape 17, light from the lamp 38 is reflected by the mirror 41 to the photoelectric cell 39. The position of the pen 16 at which the cell receives light is determined by the position of the unit 14 relative to tape 17 and, since the lamp and cell are moved simultaneously with fixed spacing and parallel to the pen and tape, a single adjustment by means of knob 31 is all that is required to predetermine the demand at which the cell 39 will be energized.

The photoelectric cell may be of any suitable type well known in the art, which by virtue of it photo-activity causes an increased conductivity of the interelectrode space when the light from the lamp 38 is reflected and admitted to the photoelectric cell. Thus the cell 39 through its response to light, becomes means for translating variation in light into variation in electric current, which when amplified by suitable amplifying means in the relay unit 12 opens the power switch 13, interrupting the flow of current through the secondary feed lines 20.

Relay unit 12 may be of any suitable type, the one illustrated comprising a vacuum tube $a$ energized from a suitable electric current source connected to terminals $b$ and $c$. The other end of cable 40 is connected to terminals L, L, C and A.

The wires of cable 40 connected to terminals L, L, lead to lamp 38 and may be connected to terminals $b$ and $c$ to supply current to the lamp. The wires connected to terminals C and A lead to the cathode and anode respectively of the photoelectric cell. The cell 39, a condenser $d$ and a potentiometer $e$ form a bridge circuit, with the grid and cathode of vacuum tube $a$ connected across opposite corners of the bridge so that a change in resistance of the cell changes the potential of the grid and thereby changes the plate current in tube $a$. The normal grid potential is adjustable by the variable contact of the potentiometer and the grid may have a resistance $i$ in series therewith. The said plate current passes through a relay coil $f$ and the connections are such that when light falls on the cell 39, contact $g$ is made by the action of coil $f$. Contact $g$ is in a circuit comprising coil $h$ of contactor or switch 13, said circuit being energized from line 19. When contact $g$ is made, switch 13 opens and thereby prevents an excessive demand. Of course, if the switch 13 is of the type wherein the actuating coil $h$ is arranged to close the switch, as may be desirable in some cases, then the contact $g$ should be arranged to open when the light beam activates the cell 39.

If found necessary, the aperture 35 may be provided with a screen for excluding extraneous light, so that the photoelectric cell 39 will function only at such times as when the reflector 41 is in a position to reflect the light from the lamp 38 to the cell.

The tape 17 is unwound from a spool 42, passes over a spool 43 and onto a receiving spool 44. In order to remove the tape 17 and to insert a new tape, the cover 45 of the demand meter may be removed by releasing the thumb screws 46. A dial 47 may be provided for registering total power consumption.

I claim:

1. In combination with a demand meter having a demand indicator, said indicator being provided with a reflector, a source of light arranged to project a light beam in the path of said reflector, light responsive means arranged to receive the reflected light when said reflector intercepts said beam, said light source and light responsive means being in fixed spacial relation with respect to each other, adjustable means for moving said source of light and light responsive means as a unit with respect to said demand meter so that light from said source will be reflected by said reflector to said light responsive means at any desired predetermined demand.

2. In combination with a demand meter having a demand indicator, said indicator being provided with a reflector, a source of light arranged to project a light beam in the path of said reflector, light responsive means arranged to receive the reflected light when said reflector intercepts said beam, said light source and light responsive means being in fixed spacial relation with respect to each other, a calibrated member associated with said light source and light responsive means, and adjustable means for moving said light source and light responsive means as a unit along said calibrated member to any one of a number of positions so that light from said source will be reflected by said reflector to said light responsive means at any desired predetermined demand.

3. In combination with a demand meter having a calibrated tape and an indicator arranged to indicate the demand on said tape, a reflector mounted on said indicator and movable therewith, a receptacle associated with said demand meter, said receptacle being divided into two compartments, a source of light in one of said compartments and a photo-electric cell in the other of said compartments, each of said compartments being provided with an aperture through which light may pass, said reflector and said receptacle being arranged so that light from said source will be reflected by said reflector to said cell when said indicator reaches a particular position on said tape.

4. In combination, a meter having a movable indicator, a reflector mounted on said indicator, a receptacle adjustably mounted on said meter, said receptacle being divided into two compartments, a lamp mounted in one of said compartments and a photo-electric cell mounted in the other compartment, said first named compartment having an aperture therein through which light from said lamp passes, and said second named compartment having an aperture therein admitting light to said cell, said reflector being arranged to reflect light from said lamp to said cell at any predetermined position of said indicator by adjusting said receptacle.

5. In combination with a demand meter having a calibrated tape and an indicator arranged to indicate the demand on said tape, a receptacle movably mounted with respect to said meter in a plane parallel to the plane of said tape, said receptacle being divided into two compartments, a source of light in one of said compartments and a photo-electric cell in the other of said compartments, a reflector mounted on said indicator to reflect light from said source to said cell and means for adjusting said movably mounted receptacle so that light from said source will be reflected to said cell at any predetermined demand, said adjusting means being calibrated into units corresponding to the calibrations on said tape for setting the receptacle at a desired demand.

WILLIAM C. PEYTON.